(12) United States Patent
Yu et al.

(10) Patent No.: US 9,185,717 B2
(45) Date of Patent: *Nov. 10, 2015

(54) TYPE II RELAY NODE INITIALIZATION PROCEDURES

(71) Applicant: BlackBerry Limited, Waterloo (CA)

(72) Inventors: Yi Yu, Reston, VA (US); Zhijun Cai, Ashburn, VA (US); Chandra Sekhar Bontu, Nepean (CA); Mo-Han Fong, Santa Clara, CA (US); Sophie Vrzic, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,074

(22) Filed: Sep. 26, 2014

(65) Prior Publication Data

US 2015/0016335 A1 Jan. 15, 2015

Related U.S. Application Data

(63) Continuation of application No. 12/819,135, filed on Jun. 18, 2010, now Pat. No. 8,891,431.

(60) Provisional application No. 61/218,908, filed on Jun. 19, 2009.

(51) Int. Cl.
| | |
|---|---|
| *H04W 72/12* | (2009.01) |
| *H04W 76/02* | (2009.01) |
| *H04W 88/04* | (2009.01) |
| *H04B 7/155* | (2006.01) |
| *H04W 74/00* | (2009.01) |
| *H04W 74/08* | (2009.01) |
| *H04W 24/02* | (2009.01) |
| *H04W 40/24* | (2009.01) |
| *H04W 84/04* | (2009.01) |

(52) U.S. Cl.
CPC ........... *H04W 72/1205* (2013.01); *H04B 7/155* (2013.01); *H04W 74/002* (2013.01); *H04W 74/0833* (2013.01); *H04W 76/02* (2013.01); *H04W 88/04* (2013.01); *H04W 24/02* (2013.01); *H04W 40/24* (2013.01); *H04W 84/047* (2013.01)

(58) Field of Classification Search
None
See application file for complete search history.

(56) References Cited

U.S. PATENT DOCUMENTS

| 6,539,432 B1 | 3/2003 | Taguchi et al. |
| 8,059,586 B2 | 11/2011 | Bi |

(Continued)

FOREIGN PATENT DOCUMENTS

| CN | 101448325 A | 6/2009 |
| EP | 2217029 A1 | 8/2010 |

(Continued)

OTHER PUBLICATIONS

Yu, Yi, et al.; U.S. Appl. No. 12/819,135, filed Jun. 18, 2010; Title: Type II Relay Node Initialization Procedures.

(Continued)

*Primary Examiner* — Ashley Shivers
(74) *Attorney, Agent, or Firm* — Conley Rose, P.C.; J. Robert Brown, Jr.

(57) ABSTRACT

A relay node including one or more components configured to encode a message to be transmitted to an access node, the message used to identify the relay node as a relay node during initialization of the relay node.

20 Claims, 7 Drawing Sheets

(56) References Cited

U.S. PATENT DOCUMENTS

| | | |
|---|---|---|
| 2004/0224688 A1 | 11/2004 | Fischer |
| 2006/0002350 A1 | 1/2006 | Behroozi |
| 2007/0097945 A1 | 5/2007 | Wang et al. |
| 2007/0286118 A1 | 12/2007 | Sohn |
| 2009/0111476 A1 | 4/2009 | Hamalainen et al. |
| 2009/0221288 A1 | 9/2009 | Zhang et al. |
| 2010/0002582 A1 | 1/2010 | Luft et al. |
| 2010/0260096 A1 | 10/2010 | Ulupinar et al. |
| 2010/0311419 A1* | 12/2010 | Bi .............................. 455/435.1 |
| 2011/0083066 A1 | 4/2011 | Chung et al. |
| 2012/0002594 A1 | 1/2012 | Racz et al. |
| 2012/0082088 A1 | 4/2012 | Dalsgaard et al. |

FOREIGN PATENT DOCUMENTS

| | | |
|---|---|---|
| JP | 2012524496 A | 10/2012 |
| WO | 2010002304 A1 | 1/2010 |
| WO | 2010123279 A2 | 10/2010 |

OTHER PUBLICATIONS

Yu, Yi, et al.; U.S. Appl. No. 12/819,130, filed Jun. 18, 2010; Title: Mobile Station Association Procedures with Type II Relays.
3GPP TR 25.931 V8.0.0; 3rd Generation Partnership Project; Technical Specification Group Radio Access Network; UTRA Functions, Examples on Signalling Procedures; Release 8; Dec. 2008; 130 pages.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pages.
3GPP TS 36.213 v8.5.0; 3rd Generation Partnership Project; Technical Specification Group Radio Access Network; Evolved Universal Terrestrial Radio Access (E-UTRA); Physical Layer Procedures; Release 8; Dec. 2008; 74 pages.
3GPP TS 36.304 v8.5.0; 3rd Generation Partnership Project; Technical Specification Group Radio Access Network; Evolved Universal Terrestrial Radio Access (E-UTRA) User Equipment (UE) Procedures in Idle Mode; Release 8; Mar. 2009; 30 pages.
3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pages.
Pabst, Ralf et al.; "Relay-Based Deployment Concepts for Wireless and Mobile Broadband Radio"; IEEE Communications Magazine; Sep. 2004; 10 pages.
Alcatel-Lucent, CHTTL; 3GPP TSG RAN WG1 #57; "System Design Frameworks to Support Type II Relay Operation In LTE-A"; R1-092157; San Francisco, CA; May 4-8, 2009; 11 pages.
China Mobile, Vodafone, Huawei; TSG-RAN WG1 #54; "Application Scenarios for LTE-Advanced Relay"; R1-082975; Jeju, Korea; Aug. 18-22, 2008; 7 pages.
Ericsson; TSG-RAN WG1 #53; "A Discussion on Some Technology Components for LTE-Advanced"; R1-082024; Kansas City, MO, USA; May 5-9, 2008; 11 pages.
Ericsson; TSG-RAN WG1 Meeting #56; "Text Proposal on Type 1 Relaying"; R1-091112; Athens, Greece; Feb. 9-13, 2009; 2 pages.
Motorola; TSG-RAN WG1 #54; "Classification of Relays"; R1-083223; Jeju, South Korea; Aug. 18-22, 2008; 3 pages.
Motorola; 3GPP TSG RAN1 #55bis; "Discussion on Transparent L2 and L3 Relays in LTE-A"; R1-090330; Ljubljana, Slovenia; Jan. 12-16, 2009; 2 pages.
Qualcomm Europe; 3GPP TSG-RAN WG1 #54; "Operation of Relays in LTE-A; R1-083191"; Jeju, S. Korea; Aug. 18-22, 2008; 5 pages.
Research in Motion, UK; 3GPP TSG RAN WG1 #57bis; "Type II Relay Reference Signal Transmission and UE Association"; R1-092419; Los Angeles, USA; Jun. 29-Jul. 3, 2009; 4 pages.
Samsung; 3GPP TSG RAN WG1 Meeting #53bis; "Application of Network Coding in LTE-Advanced Relay"; R1-082327; Warsaw, Poland; Jun. 30-Jul. 4, 2008; 4 pages.
Texas Instruments; 3GPP TSG RAN WG1 #56; "On the Design of Relay Node for LTE-Advanced"; R1-090593; Athens, Greece; Feb. 9-13, 2009; 11 pages.
Vodafone, CMCC, CHTTL, Alcatel-Lucent, Alcatel-Lucent Shanghai Bell, CATT, ITRI, HTC, ZTE, Potevio, Huawei, Interdigital, Mitsubishi Electric, Ericsson; 3GPP Meeting R1-56b; "Type II Relay Frame-Work Definition"; R1-091632; Seoul, Korea; Mar. 23-27, 2009; 4 pages.
3GPP TSG-RAN WG2 #66bis; "Access Control for RN Start Up"; R2-093978; Jun. 29-Jul. 3, 2009; Los Angeles, USA; 3 pages.
Office Action dated Jun. 19, 2012; U.S. Appl. No. 12/819,135, filed Jun. 18, 2010; 32 pages.
Office Action dated Dec. 3, 2012; U.S. Appl. No. 12/819,135, filed Jun. 18, 2010; 18 pages.
Final Office Action dated Mar. 15, 2013; U.S. Appl. No. 12/819,135, filed Jun. 18, 2010; 22 pages.
Advisory Action dated May 21, 2013; U.S. Appl. No. 12/819,135, filed Jun. 18, 2010; 3 pages.
Advisory Action dated Jul. 24, 2013; U.S. Appl. No. 12/819,135, filed Jun. 18, 2010; 4 pages.
Office Action dated Nov. 22, 2013; U.S. Appl. No. 12/819,135, filed Jun. 18, 2010; 22 pages.
Final Office Action dated Jul. 8, 2014; U.S. Appl. No. 12/819,135, filed Jun. 18, 2010; 25 pages.
Notice of Allowance dated Sep. 19, 2014; U.S. Appl. No. 12/819,135, filed Jun. 18, 2010; 13 pages.
Office Action dated Jan. 8, 2013; U.S. Appl. No. 12/819,130, filed Jun. 18, 2010; 31 pages.
Office Action dated Jul. 1, 2013; U.S. Appl. No. 12/819,130, filed Jun. 18, 2010; 24 pages.
Office Action dated Dec. 16, 2013; U.S. Appl. No. 12/819,130, filed Jun. 18, 2010; 16 pages.
Notice of Allowance dated Jun. 30, 2014; U.S. Appl. No. 12/819,130, filed Jun. 18, 2010; 11 pages.
PCT International Search Report; PCT Application No. PCT/US2010/039237; mailed Aug. 25, 2010; 4 pages.
PCT Written Opinion of the International Searching Authority; PCT/US2010/039237; mailed Aug. 25, 2010; 6 pages.
PCT International Preliminary Report on Patentability; Application No. PCT/US2010/039237; Sep. 8, 2011; 7 pages.
Chinese Office Action as Received in Co-pending Application No. 201080027239.8 on Jul. 18, 2014; 7 pages. (No English translation available).
European Extended Search Report; Application No. 12151500.1; Mar. 15, 2012; 8 pages.
Japanese Office Action; Application No. 2012-516351; Mar. 27, 2014; 8 pages.
Invitation to Pay Additional Fees and, Where Applicable, Protest Fee; PCT/US2010/039239; mailed Sep. 21, 2010; 5 pages.
PCT International Search Report; PCT Application No. PCT/US2010/039239; Nov. 9, 2010; 6 pages.
PCT Written Opinion of the International Searching Authority; PPCT/US2010/039239; Nov. 9, 2010; 10 pages.
Canadian Office Action; Application No. 2,765,474; Dec. 17, 2013; 2 pages.
Chinese Office Action; Application No. 201080027239.8; Mar. 17, 2015; 17 pages.
Canadian Office Action; Application No. 2,765,585; Aug. 26, 2015; 4 pages.

* cited by examiner

```
-- ASN1START                                                                    ┌─300

RRCConnectionRequest ::=           SEQUENCE {
        criticalExtensions                 CHOICE {
            rrcConnectionRequest-r8            RRCConnectionRequest-r8-IEs,
            criticalExtensionsFuture           SEQUENCE {}
        }
}

RRCConnectionRequest-r8-IEs ::=    SEQUENCE {
        ue-Identity                        InitialUE-Identity,
        establishmentCause                 EstablishmentCause,
        spare                              BIT STRING (SIZE (1))
}

InitialUE-Identity ::=             CHOICE {
        s-TMSI                             S-TMSI,
        randomValue                        BIT STRING (SIZE (40))
}

EstablishmentCause ::=             ENUMERATED {
                                       emergency, highPriorityAccess, mt-Access, mo-Signalling,
                                       mo-Data, "RN Access", spare2, spare1}
                                                            ↑
-- ASN1STOP                                                 ─┐
                                                          302
```

TYPE II RELAY NODE INITIALIZATION PROCEDURES

CROSS-REFERENCE TO RELATED APPLICATIONS

This application is a continuation of U.S. patent application Ser. No. 12/819,135 filed Jun. 18, 2010 by Yi Yu, et al. entitled, "Type II Relay Node Initialization Procedures" (35773-US-PAT—4214-18901), which claims priority to U.S. Provisional Patent Application No. 61/218,908 filed Jun. 19, 2009, by Yi Yu, et al, entitled "Type II Relay Node Initialization Procedures" (35773-US-PRV—4214-18900), both of which are incorporated by reference herein as if reproduced in their entirety.

BACKGROUND

As used herein, the terms "mobile station" ("MS"), "user agent" ("UA"), and "user equipment" ("UE") might in some cases refer to mobile devices such as mobile telephones, personal digital assistants, handheld or laptop computers, and similar devices that have telecommunications capabilities. Such a MS might consist of a MS and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. As used herein, the term "SIM" may also refer to "USIM" and the term "USIM" may also refer to "SIM." Alternatively, such a MS might consist of the device itself without such a module. In other cases, the term "MS" might refer to devices that have similar capabilities but that are not transportable, such as desktop computers, set-top boxes, or network appliances. The term "MS" can also refer to any hardware or software component that can terminate a communication session for a user. Also, the terms "MS," "UE," "user agent" ("UA"), "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) or LTE-Advanced (LTE-A). For example, LTE or LTE-A systems might include an Evolved Universal Terrestrial Radio Access Network (E-UTRAN) node B (eNB), a wireless access point, or a similar component rather than a traditional base station.

As used herein, the term "access node" will refer to any component of the wireless network, such as a traditional base station, a wireless access point, or an LTE or LTE-A eNB, that creates a geographical area of reception and transmission coverage allowing a MS or a relay node to access other components in a telecommunications system. In this document, the term "access node" may comprise a plurality of hardware and software. An access node, core network component, or other device, may provide wireless communications resources in an area known as a cell.

An LTE or LTE-A system can include protocols such as a Radio Resource Control (RRC) protocol, which is responsible for the assignment, configuration, and release of radio resources between a MS and an access node or relay node or other LTE equipment. The RRC protocol is described in detail in the Third Generation Partnership Project (3GPP) Technical Specification (TS) 36.331.

The signals that carry data between MSs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each MS or other network node with which it is communicating at any particular time.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. A component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms have the following definitions as used herein. Where such terms are used in the 3GPP technical specifications (TS), these terms are equivalent to the definitions provided in the 3GPP TS.

"CQI" is defined as "Channel Quality Indicator."
"CRS" is defined as "Common Reference Signal."
"DL" is defined as "Down Link."
"DRX" is defined as "Discontinuous Reception."
"EC" is defined as "Establishment Cause."
"eNB" is defined as "Evolved Node B."
"EoR" is defined as "ENB or RN."
"L1 Relay" or "Layer 1 RN" are defined as "Layer 1 relay node".
"L2 Relay" or "Layer 2 RN" are defined as "Layer 2 relay node".
"L3 Relay" or "Layer 3 RN" are defined as "Layer 3 relay node".
"LTE" is defined as "Long Term Evolution."
"LTE-A" is defined as "LTE-Advanced."
"MAC" is defined as "Medium Access Control."
"MIB" is defined as "Master Information Block."
"MME" is defined as "Mobility Management Entity."
"NAS" is defined as "Non-Access Stratum."
"PDCCH" is defined as "Physical Downlink Control Channel."
"PHY" is defined as "PHYsical layer."
"RA" is defined as "Random Access."
"RACH" is defined as "Random Access CHannel."
"RAR" is defined as "Random Access Response."
"RN" is defined as "Relay Node."
"RRC" is defined as "Radio Resource Control."
"SIB" is defined as "System Information Block."
"SRS" is defined as "Sounding Reference Signal."

The embodiments described herein relate to use of relay nodes (RNs) in a wireless communication network. The embodiments further relate to initialization procedures of a RN. The embodiments also relate to procedures for associating and/or disassociating a MS with RNs and/or eNB.

The embodiments provide for at least three different techniques for performing an initialization procedure for a RN. In an embodiment, an eNB may send a RACH response to a RN in response to a detected RACH preamble. When the RN sends back the RRCConnectionRequest message, the RN will identify itself to the eNB as an RN, as opposed to a MS, by adding a value to the Establishment Cause of the RRCConnectionRequest. In another embodiment, the RN may send the eNB an RRCConnectionSetupComplete message that is empty of content. In this manner, the eNB knows that the RACH procedure is initiated by a RN, as opposed to a MS. In yet another embodiment, a predetermined set of preambles are allocated for RNs (out of the available RACH preambles associated with the eNB). Once the eNB detects that the allocated RACH preamble belongs to the pool of RACH preambles reserved for RNs, the eNB may not institute NAS setup procedures with the enhanced packet core (EPC). The eNB may also institute NAS setup procedures with the EPC appropriate to the type of the RN. In some other embodiments, the indication to differentiate a RN from an MS can be sent by other signaling during the initialization procedure, besides those signaling described above.

In the case of associating and/or disassociating a MS with a RN and/or eNB, at least three techniques may be used to accomplish association and/or disassociation. Note that the MS may be associated with multiple RNs, and also an eNB. In one embodiment, association of a MS to a RN is based on the received signal quality of the MS uplink SRS signal. For example, when the average received signal strength (or in general any indicator representing the quality of reception, such as signal to interference plus noise ratio (SINR)) of the SRS signal of an existing associated MS is strong or stronger than some pre-defined threshold, the RN requests that the eNB associate the MS to the RN. In contrast, if the SRS signal quality becomes too weak or weaker than some pre-defined threshold, the RN may request the eNB to disassociate the MS from the RNs.

The thresholds used by RN to determine if the reception quality of the SRS signal received from the MS is too strong or too weak can be statically, semi-statically or dynamically configured by the eNB. In another embodiment, the RNs report the measured SRS signal strength to the eNB and the eNB decides if the MS should be associated with any of the RNs and/or the eNB. In one embodiment, the decision at the eNB can be based on comparing the relative signal strength of the SRS received at the RNs and the eNB. In another embodiment, association and/or disassociation is based on the RACH signal. Association or disassociation may be based on a combination of the quality of the signal received directly from the MS and the relayed RACH preamble CQI. In yet another embodiment, a combination of the SRS signal strength and RACH preamble may be used to prompt the RN to request the eNB to associate or disassociate a MS with the RN. In another embodiment, a combination of the SRS signal strength and RACH preamble relayed by the RNs to the eNB and those received directly at the eNB, may be used by the eNB to decide if the MS should associate or disassociate with the RNs.

Although the embodiments contemplate connecting to, or use of, an eNB, the embodiments also contemplate connecting to, or use of, different types of access nodes. Thus, as used herein, the term "eNB" may also mean "access node," which may include any type of access device in a communications network. Examples of other types of access nodes include layer 3 relay nodes, core networks, mobility management entities, and others.

Figure 1:
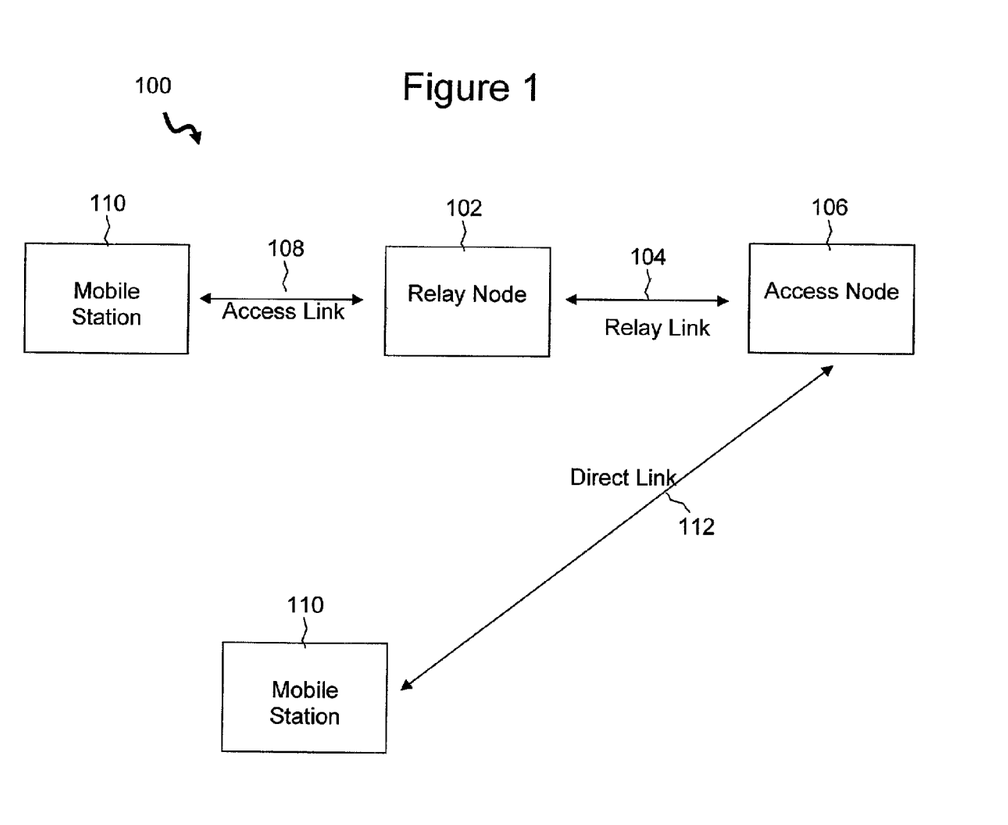
FIG. 1 is a block diagram illustrating a wireless communication system using a relay node, according to an embodiment of the disclosure.

FIG. 1 is a block diagram illustrating a wireless communication system 100 using a relay node 102, according to an embodiment of the disclosure. Generally, the present disclosure relates to the use of relay nodes in wireless communications networks. Examples of a wireless communication network includes LTE or LTE-Advanced (LTE-A) networks, and all of the disclosed and claimed embodiments could be implemented in an LTE-A network. The relay node 102 can amplify, repeat, demodulate, decode, re-encode, and/or re-modulate a signal received from a MS 110 and cause the modified signal to be received at an access node 106. In some implementations of a relay node 102, the relay node 102 receives a signal with data from the MS 110 and then generates a new signal to transmit the data to the access node 106. The relay node 102 can also receive data from the access node 106 and deliver the data to the MS 110. The relay node 102 might be placed near the edges of a cell so that the MS 110 can communicate with the relay node 102 rather than communicating directly with the access node 106 for that cell.

In radio systems, a cell is a geographical area of reception and transmission coverage. Cells can overlap with each other.

In the typical example, there is one access node associated with each cell. The size of a cell is determined by factors such as frequency band, peak transmission power levels, and channel conditions. Relay nodes, such as relay node 102, can be used to enhance coverage within or near a cell, or to extend the size of coverage of a cell. Additionally, the use of a relay node 102 can enhance throughput of a signal within a cell because the MS 110 can access the relay node 102 at a higher data rate or a lower transmission power than the MS 110 might use when communicating directly with the access node 106 for that cell. Transmission at a higher data rate within the same bandwidth creates higher spectrum efficiency, and lower power benefits the MS 110 by consuming less battery power.

Relay nodes, generally, can be divided into three groups: layer 1 relay nodes, layer 2 relay nodes, and layer 3 relay nodes. A layer 1 relay node is essentially a repeater that can retransmit a transmission without any modification other than amplification and slight delay. A layer 2 relay node can demodulate/decode a transmission that it receives, re-encode/modulate the result of the decoding, and then transmit the modulated data. A layer 3 relay node may have full radio resource control capabilities and can thus function similarly to an access node. The radio resource control protocols used by a layer 3 relay node may be the same as those used by an access node, and the relay node may have a unique cell identity typically used by an access node. A type 1 relay node can be defined such that it is a layer 3 relay node with its own physical cell identification and a complete RRC protocol stack. For the purpose of this disclosure, a relay node is distinguished from an access node by the fact that a relay node requires the presence of at least one access node (and the cell associated with that access node) and possibly other relay nodes to access other components in a telecommunications system.

The illustrative embodiments are primarily concerned with type 2 relay nodes. A type 2 relay node is a layer 2 relay node defined with the following characteristics: Type 2 relay node does not have a separate physical cell identification from the access nodes and thus would not create any new cells. A type 2 relay node should be able to relay to/from legacy (LTE Release 8) MSs, and the legacy MSs should not be aware of the presence of a type 2 relay node. The embodiments may apply to other types of relay nodes as well.

In communication system 100, the links that allow wireless communication can be said to be of three distinct types. First, when the MS 110 is communicating with the access node 106 via the relay node 102, the communication link between the MS 110 and the relay node 102 is said to occur over an access link 108. Second, the communication between the relay node 102 and the access node 106 is said to occur over a relay link 104. Third, communication that passes directly between the MS 110 and the access node 106 without passing through the relay node 102 is said to occur over a direct link 112. The terms "access link," "relay link," and "direct link" are used in this document according to the meaning described by FIG. 1.

Figure 2:
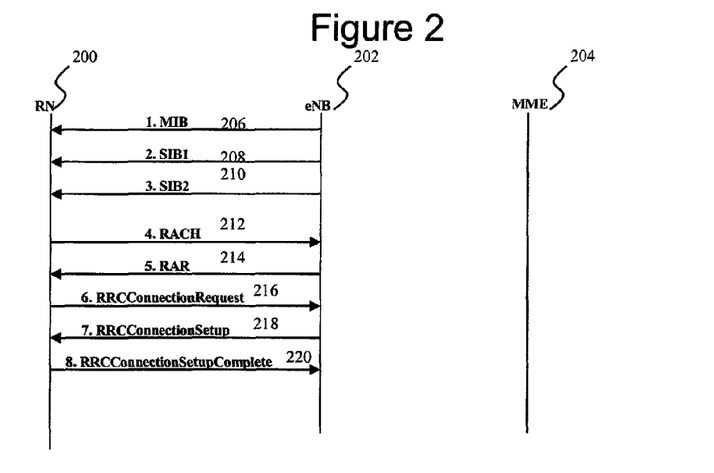
FIG. 2 shows a communication procedure among a RN, eNB, and MME, according to an embodiment of the disclosure.

FIG. 2 shows a communication procedure among a RN, eNB, and MME, according to an embodiment of the disclosure. RN 200, eNB 202, and MME 204 are components in a wireless communication network. RN 200 may correspond to RN 102 in FIG. 1, and eNB 202 may correspond with access node 106, also in FIG. 1. MME 204 is a component of a core network, which may take the form of hardware, software, or a combination thereof. In the embodiments described with respect to FIG. 2, RN 200 is a type 2 relay node. The embodiments shown in FIG. 2 may be used during initialization of a type 2 relay node.

In the embodiments described herein, RN 200 may not have a cell identification separate from that of the serving eNB 202, and thus might not create any new cells. RN 200 may be able to relay communications to and from MSs that are compliant with release 8 of the 3GPP TS. However, a release 8 compliant MS may not be aware of the presence of RN 200.

An issue faced by RN 200 is initialization, which is the process of initially connecting RN 200 to the wireless communication network, which may begin with initially establishing communication with eNB 202. In an embodiment, the RN 200 performs a random access procedure similar to the random access procedure performed by a MS when connecting to the wireless communication network. The random access procedure is particularly suited for, but not limited to, those RNs that are mobile or nomadic, wherein the locations of the RNs are not fixed.

In an embodiment, the random access procedure proceeds as follows. First, the RN 200 registers with the eNB 202 when the RN 200 initially attempts to access the wireless communication network. Then, a unique set of RNTIs are assigned to the RN 200 by the eNB 202 in the donor or current cell serving the RN 200. The identification of the RN 200 may be performed through additional parameters during the RRC setup procedure. Similar to a MS, the RN 200 may be handed-over from another eNB or from a type 1 RN. If no MSs are served by the RN 200 for a predetermined time, then the RN 200 may enter idle mode. In this manner, if applicable, battery life for a mobile RN or a nomadic RN, or in general any battery power operated RN, may be preserved. In an embodiment, only the eNB 202 to which the RN 200 is connected is aware of the existence of the RN 200. Other devices in the wireless communication network may not be aware of RN 200. While in idle mode, the RN may keep checking the DL transmission from the eNB and the UL RACH transmission from UEs periodically. The periodic wake up cycle is controlled by the eNB. On sensing reception on DL or UL, the RN may exit the idle mode as soon as possible. The RN may have to initiate a RACH procedure with the eNB when exiting the idle mode.

Thus, when the RN 200 is initially activated, the RN 200 behaves much like a MS. The RN 200 will randomly pick one of the allowed RACH preambles and transmit during a randomly selected RACH allocation in an uplink sub-frame. In an embodiment, the RN 200 obtains DL frame synchronization before listening to the MIB 206 and SIB 1 208 from the eNB 202. RACH configuration parameters are known to the RN 200 after listening to SIB 2 210.

Returning to an exemplary initialization procedure, the RN 200 attempts to access the network with a RACH, as shown at RACH message 212. In response to a detected RACH preamble from the RN 200, the eNB 202 sends a RACH response (RAR) 214 to the RN 200 allocating UL resources for the MS to initiate the RRC connection procedure. The RN 200 then initiates a RRC connection setup procedure, beginning by sending a RRCConnectionRequest message 216 to identify itself to the eNB 202 as a RN. A new value, such as "RN access" may be added to the Establishment Cause (EC) in the RRCConnectionRequest message 216. This new value informs the eNB 202 that RN 200 is a RN, as opposed to a MS.

In response, the eNB 202 sends an RRCConnectionSetup message 218 to the RN 200. The RN 200 completes the initialization procedure by sending a RRCConnectionSetupComplete message 220 to the eNB 202.

Figure 3:
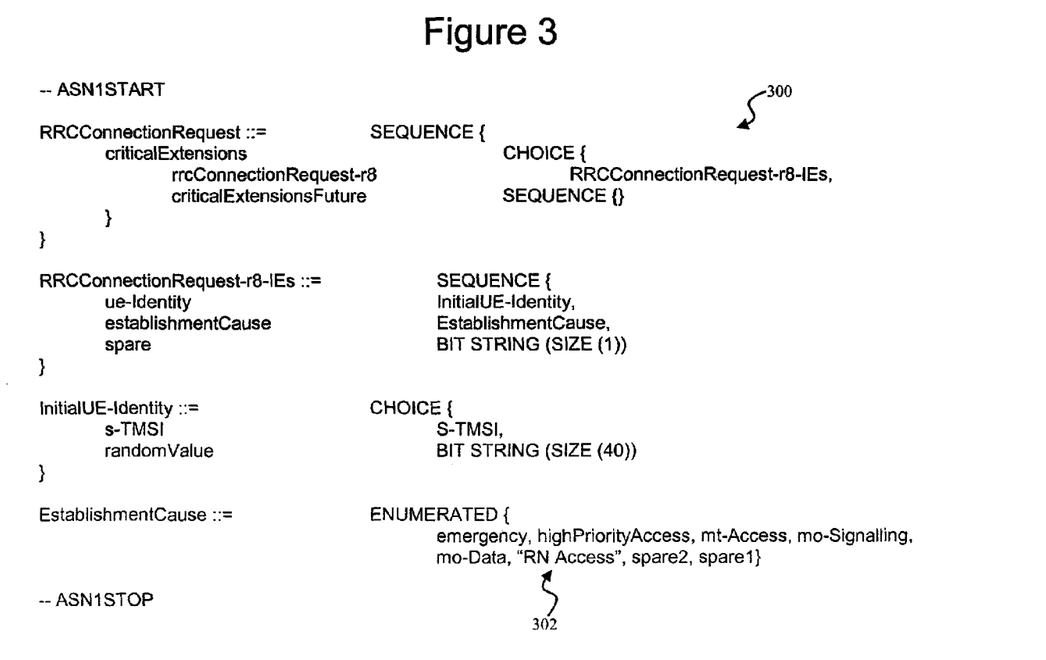
FIG. 3 shows exemplary pseudo-code for a RRCConnectionRequest message, according to an embodiment of the disclosure.

FIG. 3 shows exemplary pseudo-code for a RRCConnectionRequest message, according to an embodiment of the disclosure. The pseudo-code 300 shown in FIG. 3 may be stored, generated, and/or executed in a RN, such as RN 200 of FIG. 2, and transmitted to an eNB, such as eNB 202.

As described with respect to FIG. 2, a new "RN Access" value 302 has been added to the EstablishmentCause of the RRCConnectionRequest message. An EstablishmentCause is a message that informs the receiving device one or more reasons for the connection request. By knowing the reason for the connection request, the eNB may appropriately process the incoming connection request.

In this case, the RN Access value 302 allows an eNB, such as eNB 202 of FIG. 2, to know that the device transmitting the RRCConnectionRequest message is a RN, as opposed to a MS. Thus, the eNB may respond accordingly and manage the transmitting device as a RN, as opposed to a MS. The RN access may have different values in different embodiments. Further, the present disclosure should not be limited only to the details of the message of FIG. 3, as other messages and formats might also be used in other embodiments.

Figure 4:
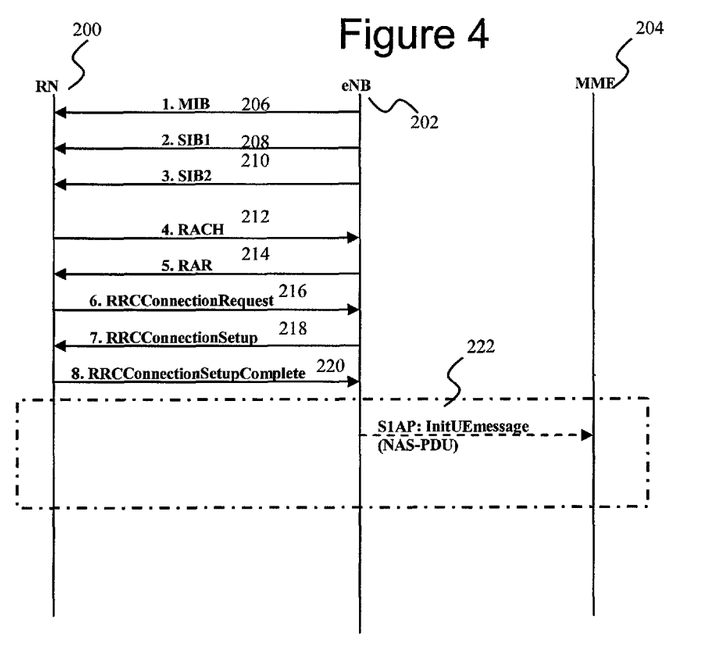
FIG. 4 shows a communication procedure among a RN, eNB, and MME, according to an embodiment of the disclosure.

FIG. 4 shows a communication procedure among a RN, eNB, and MME, according to an embodiment of the disclosure. The communication procedure shown in FIG. 4 is similar to the communication procedure shown in FIG. 2. Reference numerals in FIG. 4 that correspond to reference numeral used in FIG. 2 have similar properties. The embodiments shown in FIG. 4 may be used during initialization of a type 2 relay node.

In this embodiment, the eNB 202 may be informed that RN 200 is a RN, as opposed to a MS, by the content of the RRCConnectionSetupComplete message 220. If RRCConnectionSetupComplete message 220 contains no information that would be sent by a MS, then eNB 202 may be informed that RN 200 is a RN, as opposed to a MS.

MSs normally send information to setup a NAS connection in the RRCConnectionSetupComplete message 220. In the case of a RN, however, the RRCConnectionSetupComplete message 220 may be a dummy message, containing no information. Therefore, the eNB 202 may use this detail to differentiate whether the RACH procedure is initiated by a RN or a MS. In this embodiment, the eNB 202 receives the RRCConnectionSetupComplete message 220 and determines whether the sender is a RN or a MS based on the content, or lack of content, in RRCConnectionSetupComplete message 220. In an alternative embodiment, the RRCConnectionSetupComplete message 220 may contain some content or data that specifically informs eNB 202 that RN 200 is a RN, as opposed to a MS. Further, the present disclosure should not be limited to the use of RRCConnectionSetupComplete message 220, as other messages and formats might also be used in other embodiments.

Figure 5:
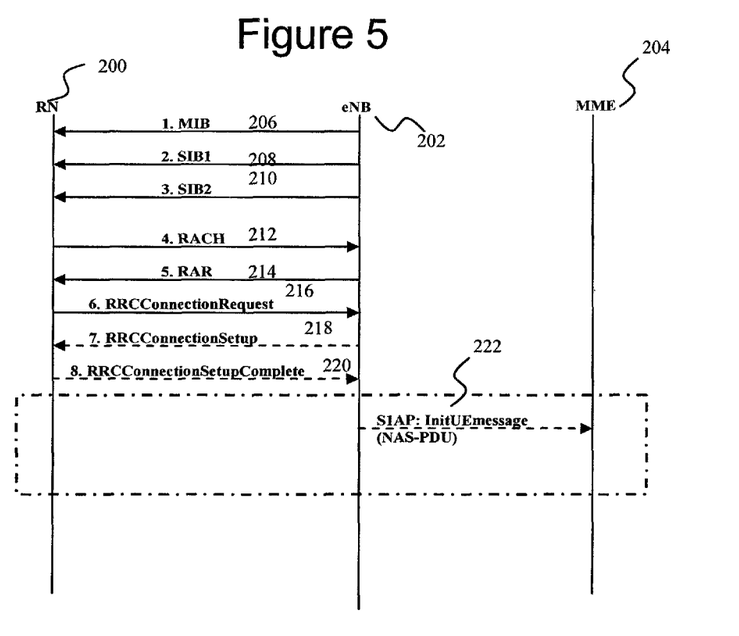
FIG. 5 shows a communication procedure among a RN, eNB, and MME, according to an embodiment of the disclosure.

FIG. 5 shows a communication procedure among a RN, eNB, and MME, according to an embodiment of the disclosure. The communication procedure shown in FIG. 5 is similar to the communication procedure shown in FIG. 2. Reference numerals in FIG. 5 that correspond to reference numeral used in FIG. 2 have similar properties. The embodiments shown in FIG. 5 may be used during initialization of a type 2 relay node.

For the embodiment shown in FIG. 5, a RACH preamble may be allocated in the RACH message 212 in order to differentiate RN 200 from a MS during initialization with the eNB 202. Once the eNB 202 detects that the RACH preamble belongs to the pool of RACH preambles reserved for RNs, the eNB may not initiate NAS setup procedures or may initiate NAS procedure appropriate to the type of relay. The eNB 202 treats the connecting entity as a RN, as the connecting entity is RN 200. A dummy RRC connection setup message can be used as handshake between the eNB 202 and the RN 200.

The embodiments described with respect to FIGS. 1 through 5 included examples of a RN distinguishing itself from a MS to an eNB during initialization of the RN. The embodiments described with respect to FIG. 6 and FIG. 7 include examples of a MS associating or disassociating with a type 2 relay nodes and/or eNB.

Figure 6:
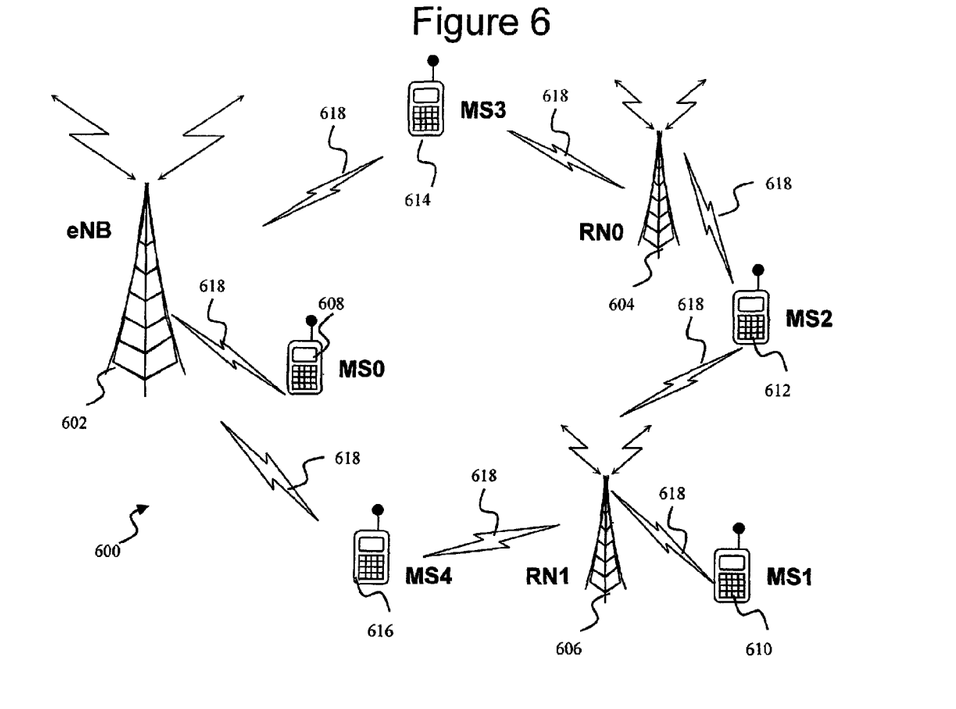
FIG. 6 shows communication among multiple MSs, RNs, and an eNB, according to an embodiment of the disclosure.

FIG. 6 shows communication among multiple MSs, RNs, and an eNB, according to an embodiment of the disclosure. Communication network 600 includes an eNB 602 and a number of RNs, including RN0 604 and RN1 606. Communication network 600 also includes a number of MSs, including MS0 608, MS1 610, MS2 612, MS3 614, and MS4 616. Communications resources among the various devices of communication network 600 are shown by lightning symbols 618. In other embodiments, communication network 600 may include more or fewer RNs, MSs, and eNBs, such as where devices connect directly to a core network or MME. In the embodiments described with respect to FIG. 7, RN0 604 and RN1 606 may be type 2 relay nodes.

Because a type 2 RN may not transmit its own CRS and does not have its own cell identification, the decision of associating a MS with a RN should be performed between an eNB and the RN. Due to MS mobility, the association should be updated from time-to-time to increase the likelihood that the MS is associated with the most desirable RN or RNs. In some cases, the MS may be associated with multiple RNs to further improve performance. In other words, there may be cooperative communication from multiple access nodes, such as eNBs and RNs.

In the embodiment described with respect to FIG. 6, MS association with a RN may be based on the MS's uplink SRS signal. When a MS with a relatively strong SRS signal or with SRS signal strength higher than a pre-defined threshold with or without hysteresis margin is detected, the RN should transmit to the eNB an association request. An association request may be a request to the eNB to associate the MS with the RN. On the other hand, when the SRS signal of an existing associated MS becomes relatively weak, as determined by a predetermined threshold with or without hysteresis margin, the RN should transmit to the eNB a disassociation request. A disassociation request may be a request to the eNB to disassociate the MS with the RN. The thresholds with or without hysteresis margin used by RN to determine if the SRS signal received from the MS is too strong or too weak can be statically, semi-statically or dynamically configured by the eNB. In another embodiment, the RN reports the measured SRS signal strength to the eNB and the eNB decides if the MS should be associated with the RN (s) and/or the eNB. In one embodiment, the decision at the eNB can be based on comparing the relative signal strength of the SRS received at the RN and the eNB. In general any signal quality indicator observed over the received SRS combined with the DL measurement reports from the UE can be used to continuously update the association of the MS with any of the nodes, eNB and RN(s).

The SRS signal may be used for this purpose because, in LTE or LTE-Advanced, the MS will continue to transmit uplink SRS for channel quality measurement and for uplink timing estimation purposes. Each MS in the donor cell has a unique SRS transmission configuration; for example, transmission comb, SRS duration, SRS bandwidth, and others. The eNB may forward these SRS configurations to one or more RNs in the donor cell. Then, the RN may monitor the transmissions in the SRS "channel" and determine which MSs are nearby.

In an embodiment, the association and disassociation should be updated at a predefined periodicity or in an eventdriven manner due to the fact that the MSs may be mobile. In the periodicity approach, the periodicity could be signaled by the eNB. Based on the corresponding measurements, the eNB may make several types of associations.

One association type may be the MS being associated with only the eNB. In this case, the RN may not transmit to or detect from the MS any data or signaling. This association type may be referred to as an "eNB-only" association.

Another association type may be the MS being associated with one or more RNs. In this case, over-the-air transmission may be scheduled at the eNB. Information may be transparently relayed to the MS through the one or more RNs. This association type may be referred to as "RN-only" association.

Yet another association type may be the MS being associated with both the eNB and the one or more RNs. In this case, over-the-air transmission may be from the eNB and the one or more RNs, using coordinated multipoint transmissions. This association type may be referred to as "multi-association."

For example, referring to FIG. 6, MS0 608 is only associated with the eNB 602, which corresponds to the eNB-only association described above. In contrast, MS1 610 and MS2 612 are associated only with the RNs RN0 604 and RN1 606, which corresponds to the RN-only association described above. However, MS3 614 and MS4 616 are associated with both the eNB 602 and with RN0 604 and RN1 606, which corresponds to the multi-association described above. In all three association types, the associations for the MSs may be updated continuously, or at a predetermined periodicity, as the MSs physically traverse the network.

In an embodiment, the eNB 602 sends the SRS transmission control information to each MS. Additionally, the eNB 602 sends the SRS transmission control information of each MS to the RNs, RN0 604 and RN1 606. The SRS transmission control information may include the SRS transmission period, measurement quantity, the SRS configurations, uplink timing information, and other information. In turn, the RNs, RN0 604 and RN1 606, receive and measure the uplink SRS transmissions according to the transmission control information.

The eNB may program a RN to transmit a measurement report based on the occurrence of one or more events. Examples of events include reaching a threshold, or expiration of a timer. The RN could also periodically transmit the measurement report without having been triggered to do so. The measurement report may include multiple users' measurement reports. The RN may also make timing estimates from the received SRS transmissions. The received SRS transmissions may also be used for timing alignment adjustments. The RN may also make the UE association decision based on the measured SRS signal strength and report the UE association decision to the eNB.

In addition to the above information, the DRX configuration of a MS may be forwarded to the one or more RNs. Forwarding the DRX configuration may be helpful for release-8 MSs because these MSs may not transmit the SRS during the DRX off-durations. Thus, even for release-8 MSs, the one or more RNs may perform suitable measurements of the MSs.

Figure 7:
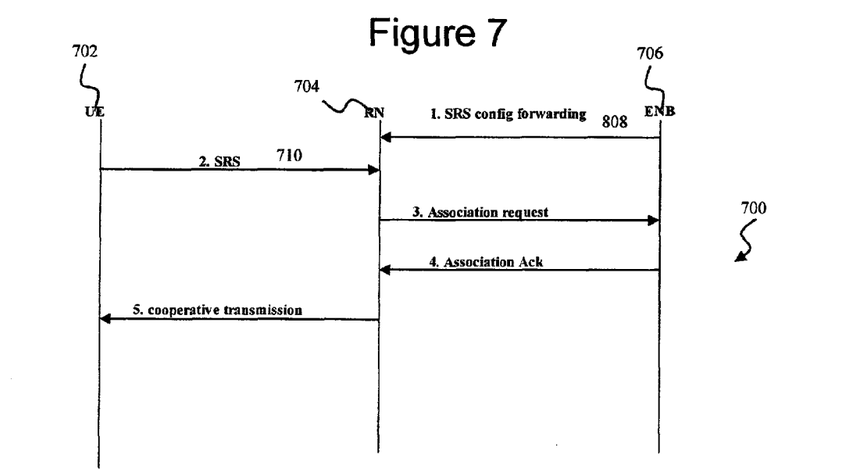
FIG. 7 shows a communication procedure among a MS, RN, and eNB, according to an embodiment of the disclosure.

FIG. 7 shows a communication procedure among a MS, RN, and eNB, according to an embodiment of the disclosure. Communication procedure 700 may be implemented among MSs in connection with one or more RNs, such as one or both of MS1 610 or MS2 612 are in connection with one or both of RN0 604 or RN1 606 of FIG. 6.

In the embodiment described with respect to FIG. 7, MS association with an RN may be based on the initial random access signal. During initial access of the MS 702 to the eNB 706 via RN 704, the eNB 706 receives a RACH preamble from the MS 702. All close-by RNs, such as RN 704, also receive the RACH preamble. The eNB 706 may then associate the MS 702 to the RN 704, based on the quality of the signal received directly from the MS 702 and the relayed RACH preamble channel quality indicator (CQI) from the RN 704. The RN, such as RN 704 may also make the UE association decision based on the received RACH preamble signal and report the associated UE identification to the eNB.

The eNB 706 may send signaling, such as a PDCCH order, MAC control element, or RRC signaling, to request the MS 702 to perform uplink random access for the association. After the reception of the signaling from the eNB 706, the MS 702 will transmit the random access preamble.

In an embodiment, the MS 702 might not need to perform the full random access procedure. For example, the SRS configuration forwarding message 708 and the SRS message 710 may be enough to associate the MS 702 with the RN 704.

In an alternative embodiment, MS association may be accomplished by combining the SRS method (FIG. 6) and the random access preamble method (FIG. 7) described above. During the initial access by MS 702, the eNB 706 may associate the MS 702 to the RN 704 or to the eNB 706, based on the received preamble signal strength. After initial association, the MS association/disassociation may be performed and updated by the MS uplink SRS transmission at SRS message 710.

Figure 8:
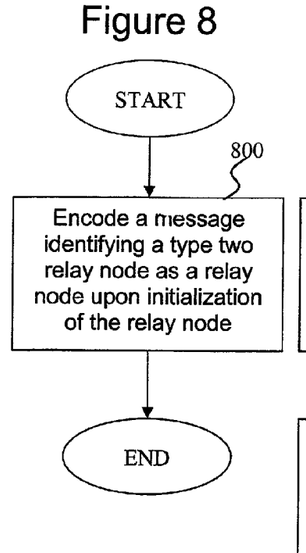
FIG. 8 is a flowchart showing a method for initializing a type 2 RN.

FIG. 8 is a flowchart showing a method for initializing a type 2 RN. The process shown in FIG. 8 may be implemented in a RN, such as RN 102 of FIG. 1. The process shown in FIG. 8 may be implemented using procedures described with respect to FIG. 2 through FIG. 5. The method includes encoding a message identifying a type two relay node as a relay node upon initialization of the relay node (block 800). The process terminates thereafter.

In an embodiment the message may be an RRCConnectionRequest message. In this case a value may be added to an Establishment Cause in the RRCConnectionRequest message. The value identifies to an access node that the type two relay node is a relay node.

In another embodiment, the message is an RRCConnectionSetupComplete message. In this case, the type two relay node is identified to an access node as a relay node when the RRCConnectionSetupComplete is devoid of content.

In yet another embodiment, the message comprises a random access channel (RACH) message. In this case, a preamble is allocated in the RACH message in order to identify to an access node that the type two relay node is a relay node. The allocated preamble may be taken from a pool of predetermined preambles.

Figure 9:
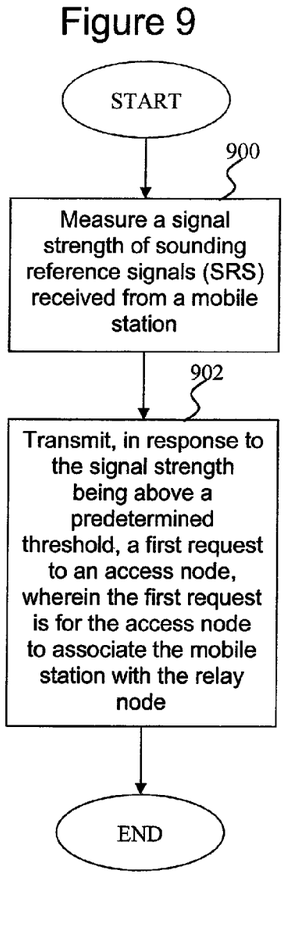
FIG. 9 is a flowchart showing a method for associating a RN with a MS.

FIG. 9 is a flowchart showing a method for associating a RN with a MS. The process shown in FIG. 9 may be implemented in a RN, such as RN 102 of FIG. 1. The process shown in FIG. 9 may be implemented using procedures described with respect to FIGS. 6 and 7.

The process begins as a RN measures a signal strength of sounding reference signals (SRS) received from a mobile station (block 900). The RN then transmits, in response to the signal strength being above a predetermined threshold, a first request to an access node (block 902). The first request is for the access node to associate the mobile station with the relay node. The process terminates thereafter.

In an embodiment, the RN transmits a second request to the access node after the first request. The second request is transmitted in response to the signal strength falling below a second predetermined threshold. The second request is for the access node to disassociate the mobile station with the relay node.

In another embodiment, the RN periodically measures the signal strength. In still another embodiment, the RN generates a measurement report of the signal strength upon satisfaction of a condition set by the access node. The condition may be one of a threshold of the signal strength and an expiration of a timer, or some other condition.

In still another embodiment, the first request establishes one type of association selected from the group consisting of: the mobile station being associated with the access node only, the mobile station being associated with one or more relay nodes only, and the mobile station being associated with both the access node and the one or more relay nodes.

Figure 10:
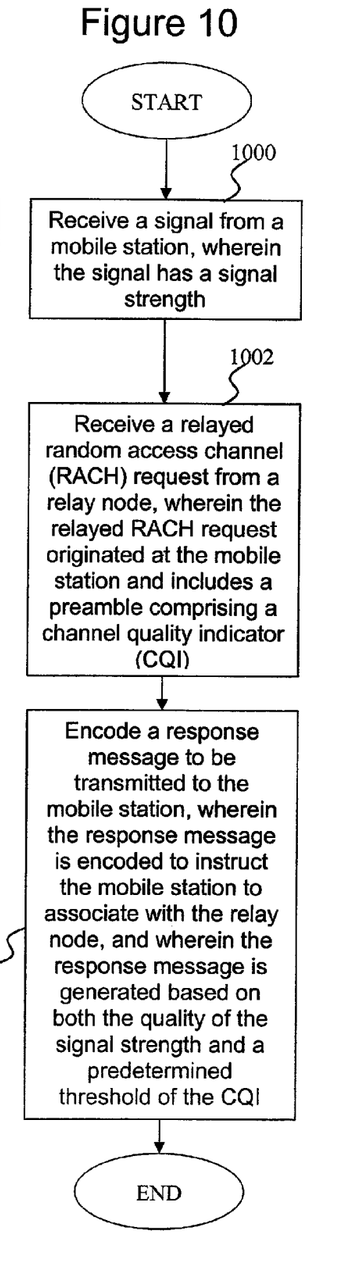
FIG. 10 is a flowchart showing a method for associating a RN with a MS.

FIG. 10 is a flowchart showing a method for associating a RN with a MS. The process shown in FIG. 10 may be implemented in an access node, such as access node 106 of FIG. 1. The process shown in FIG. 10 may be implemented using procedures described with respect to FIGS. 6 and 7.

The process begins as the access node receives a signal from a mobile station, wherein the signal has a signal strength (block 1000). The access node also receives a relayed random access channel (RACH) request from a relay node (block 1002). The relayed RACH request originated at the mobile station and includes a preamble comprising a channel quality indicator (CQI).

Next, the access node encodes a response message to be transmitted to the mobile station (bock 1004). The response message is encoded to instruct the mobile station to associate with the relay node via the random access procedure.

In an embodiment, the response message is one of a physical downlink control channel (PDCCH) order, a media access layer (MAC) control element, or a radio resource control (RRC) signaling. In another embodiment, the response message may be encoded to instruct the mobile station to transmit the preamble.

In still another embodiment, the response message may be encoded to instruct the mobile station to associate with the relay node by using less than a full random access procedure.

Figure 11:
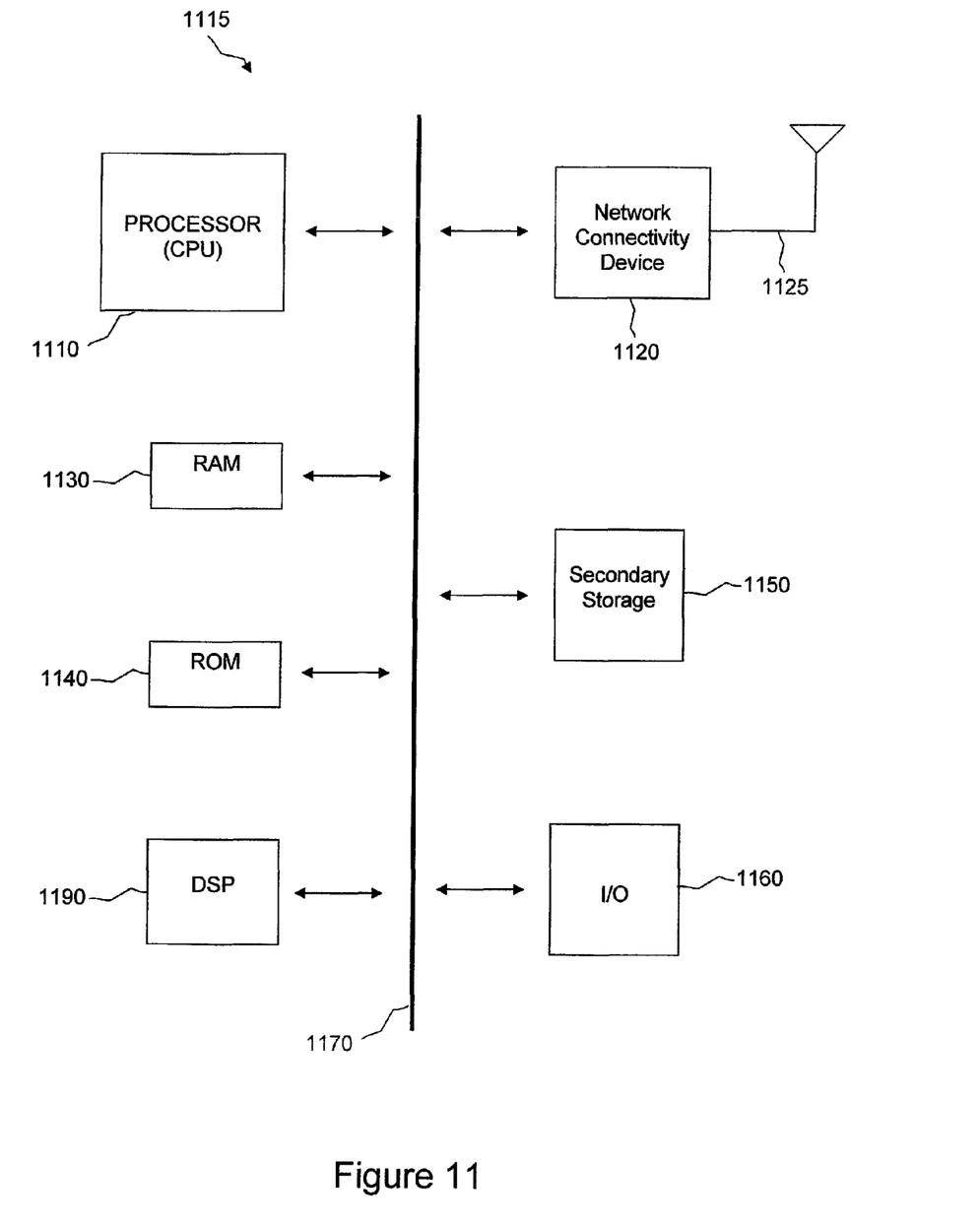
FIG. 11 shows an example of a system that includes a processing component suitable for implementing one or more embodiments disclosed herein.

The MS and other components described above might include a processing component that is capable of executing instructions related to the actions described above. FIG. 11 illustrates an example of a system 1115 that includes a processing component 1110 suitable for implementing one or more embodiments disclosed herein. In addition to the processor 1110 (which may be referred to as a central processor unit or CPU), the system 1100 might include network connectivity devices 1120, random access memory (RAM) 1130, read only memory (ROM) 1140, secondary storage 1150, and input/output (I/O) devices 1160. These components might communicate with one another via a bus 1170. In some cases, some of these components may not be present or may be combined in various combinations with one another or with other components not shown. These components might be located in a single physical entity or in more than one physical entity. Any actions described herein as being taken by the processor 1110 might be taken by the processor 1110 alone or by the processor 1110 in conjunction with one or more components shown or not shown in the drawing, such as a digital signal processor (DSP) 1190. Although the DSP 1190 is shown as a separate component, the DSP 1190 might be incorporated into the processor 1110.

The processor 1110 executes instructions, codes, computer programs, or scripts that it might access from the network connectivity devices 1120, RAM 1130, ROM 1140, or secondary storage 1150 (which might include various disk-based systems such as hard disk, floppy disk, or optical disk). While only one CPU 1110 is shown, multiple processors may be present. Thus, while instructions may be discussed as being executed by a processor, the instructions may be executed simultaneously, serially, or otherwise by one or multiple processors. The processor 1110 may be implemented as one or more CPU chips.

The network connectivity devices 1120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1120 may enable the processor 1110 to communicate with the Internet or one or more telecommunications networks or other networks from which the processor 1110 might receive information or to which the processor 1110 might output information. The network connectivity devices 1120 might also include one or more transceiver components 1125 capable of transmitting and/or receiving data wirelessly.

The RAM 1130 might be used to store volatile data and perhaps to store instructions that are executed by the processor 1110. The ROM 1140 is a non-volatile memory device that typically has a smaller memory capacity than the memory capacity of the secondary storage 1150. ROM 1140 might be used to store instructions and perhaps data that are read during execution of the instructions. Access to both RAM 1130 and ROM 1140 is typically faster than to secondary storage 1150. The secondary storage 1150 is typically comprised of one or more disk drives or tape drives and might be used for non-volatile storage of data or as an over-flow data storage device if RAM 1130 is not large enough to hold all working data. Secondary storage 1150 may be used to store programs that are loaded into RAM 1130 when such programs are selected for execution.

The I/O devices 1160 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1125 might be considered to be a component of the I/O devices 1160 instead of or in addition to being a component of the network connectivity devices 1120. One or more of the above system 1115 components may be referred to as "component" or "components" herein.

The embodiments provide for a relay node including one or more components configured to encode a message to be transmitted to an access node, the message used to identify the relay node as a relay node during initialization of the relay node. The embodiments also provide a method and a computer readable storage medium storing code to implement the method to encode a message to be transmitted to an access node, the message used to identify the relay node as a relay node during initialization of the relay node. The embodiments further provide for one or more components configured to decode a message received from a relay node and, from the message, to identify the relay node as a relay node.

In yet other embodiments, a relay node is provided that includes one or more components configured to measure a signal strength of sounding reference signals (SRS) received from a mobile station, and in response to the signal strength being above a predetermined threshold, to transmit a first request to an access node. The first request is for the access node to associate the mobile station with the relay node. The embodiments also provide for a method for implementing the above.

In yet other embodiments, an access node is provided that includes one or more components configured to receive a first request to associate a mobile station with a relay node. The first request is transmitted as a result of the relay node determining that a signal strength of a sounding reference signal (SRS) received from the mobile station is above a predetermined threshold.

The embodiments also provide for an access node including one or more components configured to receive a random access channel (RACH) transmission from a mobile station, detect the signal strength of the received RACH transmission, and receive a relayed RACH report from a relay node. The embodiments also provide for a method for implementing the above.

In yet other embodiments, a relay node is provided that includes one or more components configured to transmit a relayed random access channel (RACH) report to an access node, the relayed RACH report including a signal quality of a RACH received by the relay node from a mobile station.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A relay node comprising:
one or more components configured to:
generate a Radio Resource Control (RRC) Connection Setup Complete message during initialization, the RRC Connection Setup Complete message implicitly identifying the relay node as a user equipment acting as a relay node based on a lack of content in the RRC Connection Setup Complete message; and
transmit the RRC Connection Setup Complete message to an access node.

2. The relay node of claim 1, wherein the initialization is the Radio Resource Control (RRC) connection establishment phase of the relay node, wherein the lack of content in the RRC Connection Setup Complete message implicitly identifies the relay node to the access node.

3. The relay node of claim 1, wherein the one or more components are further configured to allocate a preamble in a random access channel (RACH) message to be transmitted to the access node.

4. The relay node of claim 3, wherein the allocated preamble is taken from a pool of predetermined preambles indicated by the access node.

5. The relay node of claim 1, wherein the one or more components are further configured to omit setting a field in the RRC Connection Setup Complete message, wherein the unset field identifies the relay node as a user equipment.

6. A method implemented in a relay node, the method comprising:
generating a Radio Resource Control (RRC) Connection Setup Complete message upon initialization, the RRC Connection Setup Complete message implicitly identifying the relay node as a user equipment acting as a relay node based on a lack of content in the RRC Connection Setup Complete message; and
transmitting the RRC Connection Setup Complete message to an access node.

7. The method of claim 6, wherein the initialization is the Radio Resource Control (RRC) connection establishment phase of the relay node, wherein the lack of content in the RRC Connection Setup Complete message implicitly identifies the relay node to the access node.

8. The method of claim 6, further comprising transmitting a random access channel (RACH) message to the access node, and wherein a preamble is allocated in the RACH message in order to identify the relay node to the access node.

9. The method of claim 8, wherein the allocated preamble is taken from a pool of predetermined preambles indicated by the access node.

10. The method of claim 6, wherein generating the RRC Connection Setup Complete message comprises excluding information elements (IEs) from the RRC Connection Setup Complete message, wherein the excluded IEs identify the relay node as a user equipment.

11. A computer readable storage device storing a program which, when executed by a processor, implements a method implemented in a relay node, the method comprising:
generating an RRCConnectionSetupComplete message upon initialization, the RRCConnectionSetupComplete message implicitly identifying the relay node as a user equipment acting as a relay node based on a lack of content in the RRCConnectionSetupComplete message; and
transmitting the RRCConnectionSetupComplete message to an access node.

12. The computer readable storage device of claim 11, wherein generating the RRCConnectionSetupComplete message further comprises excluding information elements (IEs) from the RRCConnectionSetupComplete message, wherein the excluded IEs identify the relay node as a user equipment.

13. The computer readable storage device of claim 11, the method further comprising encoding a random access channel (RACH) message to be transmitted to the access node, and wherein a preamble is allocated in the RACH message in order to identify the relay node to the access node.

14. The computer readable storage device of claim 13, wherein the allocated preamble is taken from a pool of predetermined preambles.

15. The computer readable storage device of claim 11, wherein the initialization is the Radio Resource Control (RRC) connection establishment phase of the relay node, wherein the lack of content in the RRCConnectionSetupComplete message implicitly identifies the relay node to the access node.

16. An access device comprising:
one or more components configured to:

receive a Radio Resource Control (RRC) Connection Setup Complete message from a relay node during an initialization phase; and identify the relay node as a user equipment acting as a relay node based on a lack of content in the RRC Connection Setup Complete message.

17. The access device of claim 16, wherein the one or more components are further configured to determine that the relay node is the source of the RRC Connection Setup Complete message based on a lack of information elements (IEs) in the RRC Connection Setup Complete message.

18. The access device of claim 16, wherein the initialization phase is the RRC connection establishment phase of the relay node.

19. The access device of claim 16, wherein the access node is configured to receive a random access channel (RACH) message, and wherein the one or more components identify the relay node by decoding a preamble in the RACH message.

20. The access device of claim 19, wherein the preamble is taken from a pool of predetermined preambles indicated by the access device.

* * * * *